United States Patent [19]

Hammer

[11] 3,949,849

[45] Apr. 13, 1976

[54] VISCOUS FLUID CLUTCH

[75] Inventor: Dale F. Hammer, Bellbrook, Ohio

[73] Assignee: General Motors Corporation, Detroit, Mich.

[22] Filed: Nov. 18, 1974

[21] Appl. No.: 524,659

[52] U.S. Cl. ............... 192/58 B; 73/368.6; 137/79; 192/82 T
[51] Int. Cl.² .................. F16D 35/00; F16D 43/25
[58] Field of Search ........ 192/58 B, 82 T; 73/368.6; 137/79, 468

[56] References Cited
UNITED STATES PATENTS

| | | | |
|---|---|---|---|
| 1,399,200 | 12/1921 | Edelman | 137/468 X |
| 2,639,189 | 5/1953 | Bragg et al. | 73/368.6 X |
| 3,410,141 | 11/1968 | Zurstadt | 73/368.6 X |
| 3,552,532 | 1/1971 | Thomas et al. | 192/82 T |

Primary Examiner—Allan D. Hermann
Attorney, Agent, or Firm—John P. Moran

[57] ABSTRACT

A temperature-responsive shear drive-type fan clutch including a bourdon tube arrangement for actuating the valve plate controlling flow of shear drive fluid from the reservoir chamber to the working chamber, and external chamber means containing a suitable thermal-sensitive expanding fluid adapted to cause the bourdon tube to straighten in response to increased ambient temperature.

1 Claim, 2 Drawing Figures

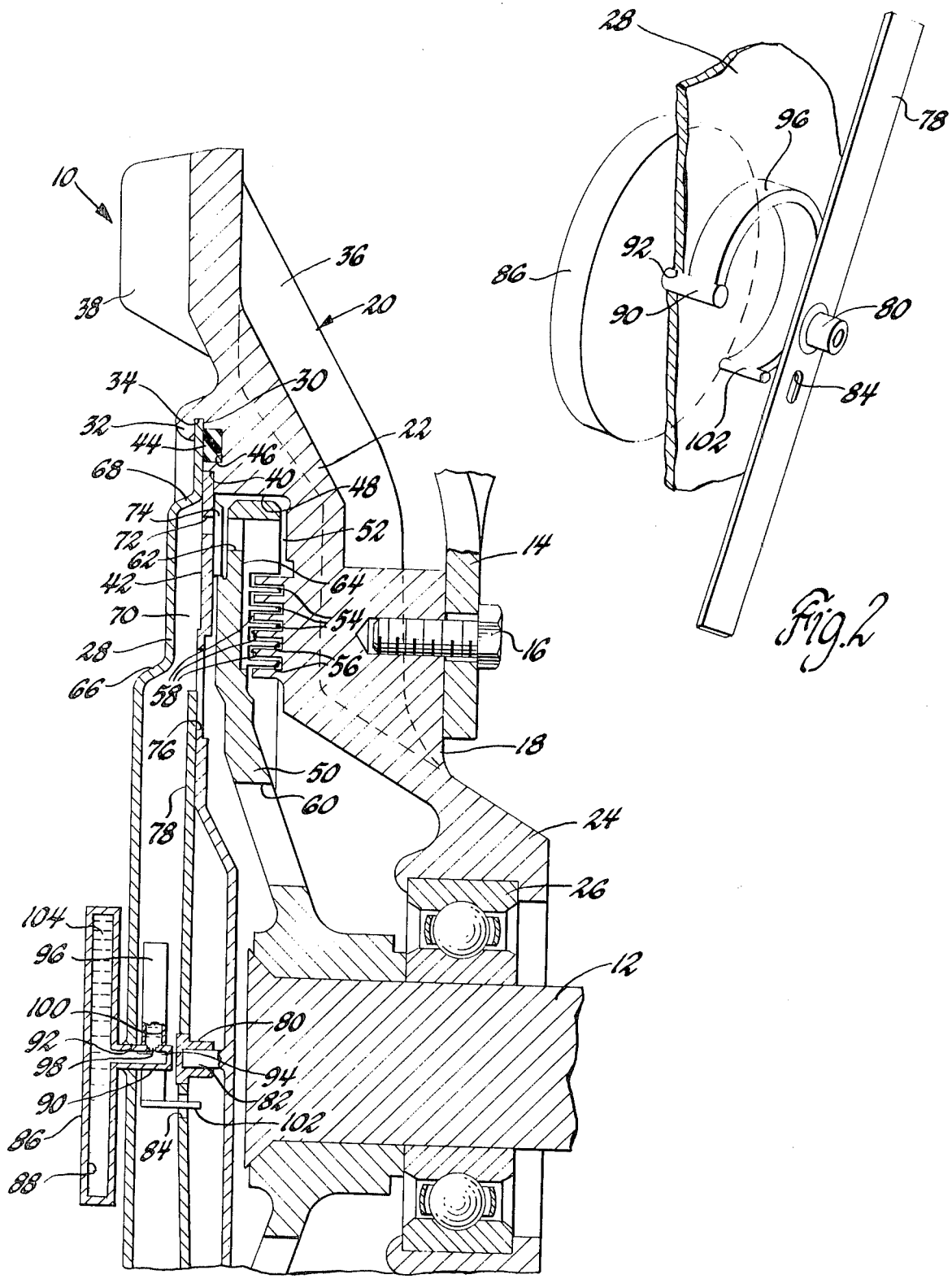

VISCOUS FLUID CLUTCH

This invention relates generally to viscous fluid clutches and, more particularly, to temperature-responsive actuator arrangements for controlling the valve means therein.

Currently, viscous fluid clutches generally employ either an external or an internal bimetallic thermostatic valve control element for controlling the flow of the fluid medium from the usual reservoir chamber to the working chamber. While such arrangements are generally satisfactory, the internal bimetal is not directly subjected to ambient temperature, and the external bimetal must wind or unwind in response to temperature changes, and must include suitable sealing means for the center pin or shaft which is rotated thereby in an opening formed through the clutch or cover member to actuate the valve.

Accordingly, an object of the invention is to provide a viscous fluid clutch having external means for directly sensing ambient temperature and actuating the internal valve means accordingly, without employing rotatable components requiring sealing means in conjunction with the clutch cover member.

Another object of the invention is to provide a viscous fluid clutch having external fluid pressure means for controlling the movement of an internal bourdon tube associated therewith and operatively connected to the clutch valve means.

A further object of the invention is to provide a viscous fluid clutch having a disk-shaped container retained outside and adjacent the clutch cover member via a hollow stem member fixedly mounted through an opening in the cover member, a bourdon tube secured at one end thereof to the inner end of the hollow stem member, with a drive pin formed on the other end of the bourdon tube for connection with the clutch valve plate, and a suitable thermal-sensitive expanding fluid retained in the disk-shaped container, the hollow stem and the bourdon tube, the pressure thereof increasing in response to increased ambient temperature to straighten out the bourdon tube, the drive pin on the latter thereby causing the valve plate to open the inlet between the reservoir chamber and the working chamber, permitting the viscous fluid medium to return to the latter chamber to effectuate an "engaged" mode between the clutch plate and the clutch housing.

These and other objects and advantages of the invention will be apparent when reference is made to the following description and accompanying drawings, wherein:

FIG. 1 is a fragmentary cross-sectional view of a viscous fluid clutch embodying the invention; and FIG. 2 is a fragmentary perspective view of the inventive portion of the FIG. 1 structure.

Referring to the drawings in greater detail, FIG. 1 illustrates a viscous fluid clutch 10 mounted on a drive shaft 12 extending from the conventional water pump [not shown]. A cooling fan 14 is secured by bolts 16 to a mounting surface 18 formed on the clutch 10. The viscous fluid clutch 10 and the cooling fan 14 are located between the engine and the radiator in the conventional manner.

The clutch 10 includes a housing or output member 20 which includes a rear wall member 22 having a hub 24 which is rotatably mounted by a suitable bearing 26 on the drive shaft 12. The housing 20 further includes a cover or front wall member 28 which has an annular flat surface 30 formed adjacent its peripheral edge, the latter being confined by an annular lip 32 in an annular recess 34 formed in the housing 20. Cooling fins 36 and 38 are formed on the outer surfaces of the rear wall member 22 and the cover member 28, respectively. A second annular recess 40 is formed in the rear wall member 22 radially inward of the outer periphery of the first annular recess 34. A divider wall or pump plate 42 is mounted with its outer edge extending into the recess 40 intermediate the cover member 28 and the rear wall member 22. A seal 44 is compressed by the flat surface 30 of the cover member 28 in an annular groove 46 formed in the rear wall member 22 intermediate the outer edges of the annular recesses 34 and 40. A third annular deeper recess 48 is formed in the rear wall member 22 radially inward of the second annular recess 40. A clutch plate 50 is secured at its center by any suitable means to the drive shaft 12, the outer peripheral portion thereof being freely located in an operating or working chamber 52 formed by the third annular recess 48.

Adjacent portions of the clutch plate 50 and the rear wall member 22 are provided with torque-transmitting elements consisting of cooperating annular ridge and groove elements 54 and 56, respectively, with an intervening fluid shear space 58 therebetween to accommodate a suitable viscous fluid, such as silicone, as a torque-transmitting medium.

The clutch plate 50 further includes a plurality of equispaced openings 60 formed therein at a point radially inward from the ridge and groove elements 54 and 56. A pair of oppositely disposed smaller openings 62 are formed in the clutch plate 50 adjacent the outermost edge thereof. A pair of radial grooves, such as V-shaped grooves 64, are formed in the clutch plate 50 across the ridges 54 and terminating at the openings 62. The grooves 64 assist in the processes of filling and removing the fluid medium operative in the working chamber 52.

The front wall or cover member 28 includes concentric contoured portions 66 and 68 intermediate the center and peripheral edge thereof which forms an annular reservoir chamber 70 with the pump plate 42. One or more pump outlet openings 72 are formed through the pump plate 42 circumferentially adjacent pump or dam elements 74 formed on the pump plate 42, the openings 72 communicating between the working chamber 52 and the annular reservoir 70. The pump element 74 may consist of a circular boss formed on the pump plate 42 by any suitable means, such as stamping, or it may be a rectangular-shaped or other-shaped member secured to the pump plate 42, such as by welding. In some applications one outlet and one pump element may be sufficient, while other applications may require two such pumping arrangements.

one or more inlet ports 76 are also formed in the pump plate 42, communicating between the annular reservoir 70 and the working chamber 52 radially inward of the pump elements 74 and the pump outlet openings 72.

The inlet port 76 is at times closed off by a valve plate 78, which is normally responsive to temperature changes but which may be made responsive to centrifugal force. The valve plate 78 is illustrated as being rotatably mounted via a central cup-shaped member 80 on a projection 82 formed on the pump plate 42. A drive slot 84 is formed in the valve plate 78 adjacent the central cup-shaped member 80.

A hollow disk-shaped housing or container 86 forming a chamber 88 is mounted adjacent and parallel to the cover member 28. A hollow stem 90 extends through and is secured within a central opening 92 formed in the cover member 28. The chamber 94 formed by the hollow stem 90 communicates with the chamber 88. A conventional arcuate-shaped bourdon tube 96 is secured at one end thereof to a side of the stem 90, within the reservoir chamber 70. A port 98 is formed in the wall of the hollow stem 90 for communication between the chamber 94 and the inner passageway 100 of the bourdon tube 96. A drive pin 102 is formed on the free end of the bourdon tube 96 and extends through the drive slot 84 in the valve plate 78. A suitable thermal-sensitive expandable fluid 104 is contained within the chambers 88 and 94 and the passageway 100. Thus, any expansion of the fluid 104 in response to increased ambient temperature creates an internal pressure within the bourdon tube 96, such internal pressure causing the tube 96 to straighten out, resulting in rotation of the valve plate 78, to thus control the flow of fluid medium from the reservoir chamber 70 through the inlet port 76 to the working chamber 52.

As is well known to those skilled in the fluid clutch art, upon rotation of the clutch plate 50 by the input shaft 12, torque is transmitted to the adjacent housing or output member 20 by the shear action of the fluid medium in the working chamber 52. Rotation of the output member or housing 20 effects rotation of the cooling fan 14 secured by the bolts 16 to the mounting surface 18 formed on the housing 20, the speed thereof being influenced by the shear drive of the variable volume of fluid medium in the chamber 52.

The latter chamber 52 is substantially emptied by virtue of the fluid medium being pumped through the continuously open pump outlet opening 72 by the action of the pump element 74 serving as a dam or wiper, forcing the fluid to flow into the opening 72 and, thence, into the annular reservoir 70. Under this condition, commonly known as the "disengaged mode", the slip between the clutch plate 50 and the housing 20 is greatest, and fan 14 speed is correspondingly low.

As indicated above, the response of the bourdon tube 96 to increasing ambient temperature causes the drive pin 102 in the slot 84 to rotate the valve plate 78, progressively uncovering the inlet port 76 in the pump plate 42, and permitting the fluid to flow through the port 76 back into the working chamber 52 until the annular levels in both the working chamber 52 and the reservoir chamber 70 are at the same level, at which time the housing 20 and, hence, the fan 14 rotate at a minimal slip-speed with respect to the clutch plate 50, thereby effecting a so-called "engaged mode" or maximum cooling function.

So long as the inlet port 76 in the pump plate 42 remains open, a fluid circulation process will prevail, i.e., the rotating pump or dam elements 74 will continue to promote the flow of fluid from the working chamber 52 through the pump outlet openings 72 into the annular reservoir 70, from whence it will return to the working chamber 52 via the open inlet ports 76.

It should be apparent that the invention provides a novel temperature-responsive valve-actuating arrangement for use with a viscous fluid clutch, wherein the fluid pressure of a suitable temperature-responsive expanding fluid, retained in an externally mounted disk-shaped container, is communicated via a hollow container-mounting stem to a bourdon tube, the latter thereupon straightening out in response to increased internal pressure to rotate the clutch valve plate and thus open the inlet between the reservoir and working chambers, permitting the viscous fluid medium to enter the latter chamber and engage the clutch housing and clutch plate to drive the usual cooling fan during increased ambient temperature conditions.

While but one embodiment of the invention has been shown and described, other modifications thereof are possible.

I claim:

1. A viscous fluid clutch comprising first and second relatively rotatable drive members, said first drive member including front and rear walls and defining a fluid cavity therebetween, a cooling fan mounted on an outer surface of said first drive member, a divider wall sealed between said front and rear walls in said fluid cavity and dividing said fluid cavity into first and second chambers, said second drive member being rotatable in said first chamber, said second drive member and said rear wall having opposed spaced parallel surfaces defining a fluid shear space therebetween and cooperable with a fluid medium in said shear space to provide a shear-type fluid drive therebetween, a first opening formed in said divider wall for providing communication between said first chamber and said second chamber, a dam element formed on said divider wall in said first chamber adjacent said first opening for causing said fluid medium to flow through said first opening for varying the volume of fluid medium in said shear space to vary the torque transmitted between said first and second drive members, a second opening formed in said divider wall for at times communicating said fluid medium from said second chamber to said first chamber, valve means for controlling the flow of said fluid medium through said second opening to further vary the torque transmitted between said first and second drive members, a drive slot formed in said valve means, a hollow disk having a hollow stem formed thereon and extended through and secured within an opening formed in said front wall, the interiors of said hollow disk and said hollow stem being in communication with one another, a bourdon tube connected at one open end thereof to said hollow stem in said second chamber, the interiors of said hollow stem and said bourdon tube being in communication with one another, a drive pin formed on the other closed end of said bourdon tube and extended through said drive slot, and a thermal-sensitive expandable fluid contained in said hollow disk, said hollow stem and said bourdon tube for causing said bourdon tube to straighten out in response to increased ambient temperature and corresponding increased pressure of said expandable fluid and, thereby, causing said valve means to uncover said second opening to permit said fluid medium to flow from said second chamber to said first chamber to provide said shear-type fluid drive between said first and second drive members and thus drive said cooling fan.

* * * * *